(12) United States Patent
Kondou

(10) Patent No.: US 11,458,553 B2
(45) Date of Patent: Oct. 4, 2022

(54) CARTRIDGE AND MILLING TOOL

(71) Applicant: TUNGALOY CORPORATION, Fukushima (JP)

(72) Inventor: Yuma Kondou, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 308 days.

(21) Appl. No.: 16/629,536

(22) PCT Filed: Aug. 31, 2018

(86) PCT No.: PCT/JP2018/032291
§ 371 (c)(1),
(2) Date: Jan. 8, 2020

(87) PCT Pub. No.: WO2019/073716
PCT Pub. Date: Apr. 18, 2019

(65) Prior Publication Data
US 2020/0122249 A1    Apr. 23, 2020

(30) Foreign Application Priority Data
Oct. 10, 2017   (JP) .............................. JP2017-196896

(51) Int. Cl.
*B23C 5/24* (2006.01)
*B23C 5/22* (2006.01)
*B23C 5/06* (2006.01)

(52) U.S. Cl.
CPC .............. *B23C 5/2472* (2013.01); *B23C 5/06* (2013.01); *B23C 5/2204* (2013.01); *B23C 2200/0455* (2013.01); *B23C 2240/24* (2013.01)

(58) Field of Classification Search
CPC ........ B23C 2200/0455; B23C 2240/24; B23C 2260/04; B23C 5/06; B23C 5/2204;
(Continued)

(56) References Cited

U.S. PATENT DOCUMENTS 4,040,156 A * 8/1977 Tack .......................... B23C 5/24
407/47
4,428,704 A * 1/1984 Kalokhe ........... B23B 29/03421
407/89
(Continued)

FOREIGN PATENT DOCUMENTS

CN          1169686 A     1/1998
CN      203621587 U     6/2014
(Continued)

OTHER PUBLICATIONS

International Search Report issued in PCT/JP2018/032291; dated Dec. 4, 2018.
Written Opinion issued in PCT/JP2018/032291; dated Dec. 4, 2018.

*Primary Examiner* — Sara Addisu
(74) *Attorney, Agent, or Firm* — Studebaker & Brackett PC

(57) ABSTRACT

A purpose is to provide a cartridge that can adjust position even if a body does not have an adjusting mechanism.
A cartridge 10 is provided on a body B of a milling tool. The cartridge 10 is connected to an upper surface 10a, a lower surface 10b, and a first side surface 10c, and a slit 10h that divides the cartridge 10 into a main body part 10j, a thin material portion 10k, and a connecting part 10m that connects the main body part and the thin material portion is formed in the cartridge. Furthermore, a screw hole 10n with second female threads is formed in order for a second male screw that passes through the slit 10h to screw into. Furthermore, wherein the second male screw travels forward, the relative position of the main body part 10j changes with regard to the thin material portion 10k.

12 Claims, 13 Drawing Sheets

(58) Field of Classification Search
CPC ....... B23C 5/2226; B23C 5/2252; B23C 5/24; B23C 5/2472; B23C 5/2486
See application file for complete search history.

(56) References Cited

U.S. PATENT DOCUMENTS

| | | | | |
|---|---|---|---|---|
| 4,547,100 A * | 10/1985 | Naccarato | ............. | B23C 5/2252 407/46 |
| 4,692,069 A * | 9/1987 | Kieninger | ............. | B23C 5/2489 82/902 |
| 4,786,217 A * | 11/1988 | Johne | ................ | B23B 29/03421 407/45 |
| 5,102,268 A * | 4/1992 | Mitchell | ............... | B23C 5/2226 407/46 |
| 5,704,742 A * | 1/1998 | Reinauer | ................ | B23C 5/109 408/156 |
| 5,709,510 A * | 1/1998 | Scheer | ............. | B23B 29/03421 408/156 |
| 5,833,403 A * | 11/1998 | Barazani | ................ | B23B 27/04 407/101 |
| 6,186,704 B1 * | 2/2001 | Hale | ..................... | B23B 29/043 407/107 |
| 6,511,264 B2 * | 1/2003 | Ripley | .................. | B23C 5/2493 407/43 |
| 8,091,205 B2 * | 1/2012 | Kadosh | ................ | B23C 5/2226 407/39 |
| 9,862,040 B2 * | 1/2018 | Kocherovsky | ...... | B23B 29/0341 |
| 2001/0051075 A1 * | 12/2001 | Focken | ................. | B23C 5/2493 407/34 |
| 2004/0161311 A1 * | 8/2004 | Satran | ....................... | B23C 5/08 407/46 |
| 2004/0191008 A1 * | 9/2004 | Noggle | .................... | B23C 5/06 407/46 |
| 2007/0127992 A1 * | 6/2007 | Spichtinger | ............. | B23C 5/006 407/45 |
| 2008/0232910 A1 * | 9/2008 | Hecht | ....................... | B23C 5/24 407/104 |
| 2011/0188951 A1 * | 8/2011 | Mergenthaler | ............ | B23C 5/24 407/44 |
| 2013/0071193 A1 * | 3/2013 | Kocherovsky | ...... | B23B 29/0341 81/436 |
| 2014/0234039 A1 * | 8/2014 | Mada | .................. | B23B 29/0341 407/77 |
| 2015/0217384 A1 * | 8/2015 | Saji | ....................... | B23C 5/2226 407/93 |
| 2016/0114413 A1 | 4/2016 | Sakuyama et al. | | |

FOREIGN PATENT DOCUMENTS

| | | | | |
|---|---|---|---|---|
| JP | H06-320324 A | | 11/1994 | |
| JP | 2009095894 A | * | 5/2009 | ............... B23C 5/06 |
| JP | 2009-119572 A | | 6/2009 | |
| JP | 2014-213404 A | | 11/2014 | |
| JP | 2015047693 A | * | 3/2015 | ........... B23C 5/2204 |
| WO | 96/18473 A1 | | 6/1996 | |
| WO | 2004/071696 A1 | | 8/2004 | |
| WO | 2009/048098 A1 | | 4/2009 | |

* cited by examiner

CARTRIDGE AND MILLING TOOL

TECHNICAL FIELD

The present invention relates to a cartridge and milling tool.

BACKGROUND TECHNOLOGY

Patent Document 1 describes an insert 1 having a substantially parallelogram flat plate shape with a mounting hole, wherein a pair of corner portions 11 facing each other are formed at a pair of acute angle portions, side surfaces on adjacent short sides that sandwich the corner portion 11 are relief surfaces 12, a side surface of the long side is relief surface 13, and an upper surface including the corner portion 11 is a scoop surface 14. Furthermore, FIG. 2 illustrates a cutting edge exchangeable cutting tool for attaching the insert 1 to the tool holder 2.

Patent Document 2 discloses a cutting blade position adjusting mechanism 1 for adjusting a position of a cutting blade 8 of a cutting blade member 4 by moving the cutting blade member 4 mounted on the tool main body 2 with respect to the tool main body 2, comprising:
a shaft member 5 extending between the tool main body 2 and the cutting blade member 4 and screwed into the tool main body 2;
a nut member 6 that is screwed into the shaft member 5 and abuts against the cutting blade member 4;
wherein the shaft member 5 has a first screw portion 21 screwed into the tool body 2 and a second screw portion screwed into the nut member 6 coaxially provided at different positions along the axis C direction of the shaft member 5; a screw pitch of the first screw portion 21 and a screw pitch of the second screw portion are different from each other.

PRIOR TECHNOLOGY DOCUMENTS

Patent Documents

Patent Document 1: Japanese Unexamined Patent Application JP 2009-119572
Patent Document 2: Japanese Unexamined Patent Application JP 2014-213404

SUMMARY OF THE INVENTION

Problem to be Solved by the Invention

These patent documents disclose a method for adjusting the position of the cartridge with regard to the body of the milling tool using an adjusting mechanism with a screw between the body of the milling tool and the cartridge in order to adjust the position of the cartridge that holds the cutting insert.

However, this method requires a special cartridge that supports an adjusting mechanism.

On the other hand, there are many simple block shaped cartridges that do not support an adjusting mechanism. These cartridges cannot be adjusted using an adjusting mechanism, so that a body that corresponds to the block shape must be prepared, which is not economical.

An object of the present invention is to provide a cartridge and a milling tool that can adjust position even if the body does not have an adjusting mechanism.

Means for Solving the Problems

The cartridge according to one aspect of the present invention can be mounted on the body of a milling tool. Furthermore, the cartridge comprises an upper surface, a lower surface, at least a first side surface, second side surface and third side surface joined to the upper surface and the lower surface; and a holder part for holding the cutting insert; wherein a slit that connects the upper surface, the lower surface and the first side surface and that divides the cartridge into a main body part, a thin material portion, and a connecting part that connects the main body part and the thin material portion; a through hole where a first male screw for retaining the body and the cartridge passes through by screwing into first female threads provided in the body; and a screw hole with second female threads formed in order for a second male screw to screw into and that connects with the slit and remains in the cartridge, are formed; the second male screw that screws into the second female threads has a different relative position of the main body part with regard to the thin material portion when at a first position in the axial direction of the second female threads as the second male screw that screws into the second female threads with regard to the thin material portion when at a second position in the axial direction of the second female threads; and the head part of the second male screw when at the second position makes contact with the cartridge.

With this aspect, the relative position of the main body part with regard to the thin material portion at the first position in the axial direction of the second female threads and the relative position of the main body part with regard to the thin material portion when the second male screw that screws into the second female threads is at the second position in the axial direction of the second female threads are different, and therefore the position of the cutting insert held by the holder part can be adjusted even if the body does not have an adjusting mechanism, by adjusting the position in the axial direction of the second male screw.

Furthermore, the cartridge according to another aspect of the present disclosure has a holder part for holding a cutting insert, and can be mounted on a body of a milling tool. Furthermore, a screw hole in which at least fourth female threads are formed is provided, and a fourth male screw that screws into the fourth female threads has a contacting part that contacts when progressing in the axial direction of the fourth female threads, and when mounted on the body of the milling tool, the relative position of the holder part with regard to the body will change due to this contact.

With this aspect, the fourth male screw has a contacting part that contacts when progressing in the axial direction of the fourth female threads, the relative position of the holder part with regard to the body changes due to this contact, and therefore the position of a cutting insert held by the holder part can be adjusted even if the body does not have an adjusting mechanism.

Furthermore, the milling tool according to another aspect of the present disclosure is a milling tool with a body on which a plurality of these cartridges are mounted.

With this aspect, the position of the blade edge of the cutting insert held by each cartridge can be adjusted even if the body does not have an adjusting mechanism.

Effect of the Invention

The present invention can provide a cartridge and a milling tool that can adjust position even if the body does not have an adjusting mechanism.

DESCRIPTION OF THE PREFERRED EMBODIMENTS

Figure 1:
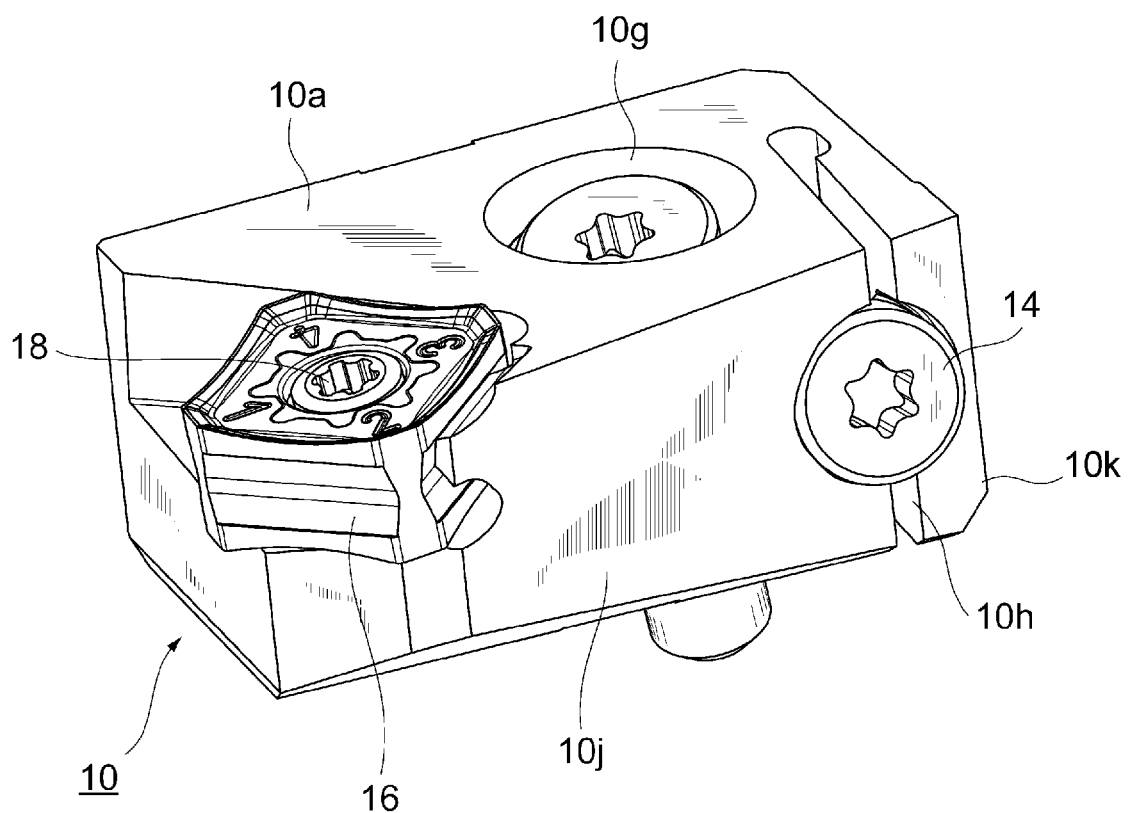
FIG. 1 is a perspective diagram of a cartridge 10 according to a first embodiment.

An embodiment of the present invention will be described below while referring to the drawings. Note that identical elements are assigned the same symbols, and a duplicate description is omitted. Furthermore, the following embodiment is an example for describing the present invention, and does not in any way restrict the present invention only to this embodiment. Furthermore, the present invention can have various variations so long as the gist of the invention is not violated. For example, a configuration that is applied to one embodiment can be applied to other configurations within the scope of the creative ability of a person of ordinary skill in the art.

First Embodiment

FIG. 1 is a perspective view of a cartridge 10 according to a first embodiment. FIG. 2A, FIG. 2B, FIG. 2C, FIG. 3A, FIG. 3B and FIG. 3C illustrate a plan view, left side surface view, front surface view, right side surface view, back surface view, and bottom surface view, respectively, of the cartridge 10.

As illustrated in these diagrams, the cartridge 10 has an upper surface 10a and a lower surface 10b. The upper surface 10a and the lower surface 10b include mutually parallel flat surfaces.

Furthermore, the cartridge 10 includes a first side surface 10c that connects the upper surface 10a and the lower surface 10b, a second side surface 10d that connects the upper surface 10a, the lower surface 10b, and the first side surface 10c, a third side surface 10e that connects an upper surface 10a, a lower surface 10b, and the second side surface 10d, and a fourth side surface 10f that connects the upper surface 10a, the lower surface 10b, the third side surface 10e, and the first side surface 10c, as surfaces of the cartridge 10.

Figure 2A:
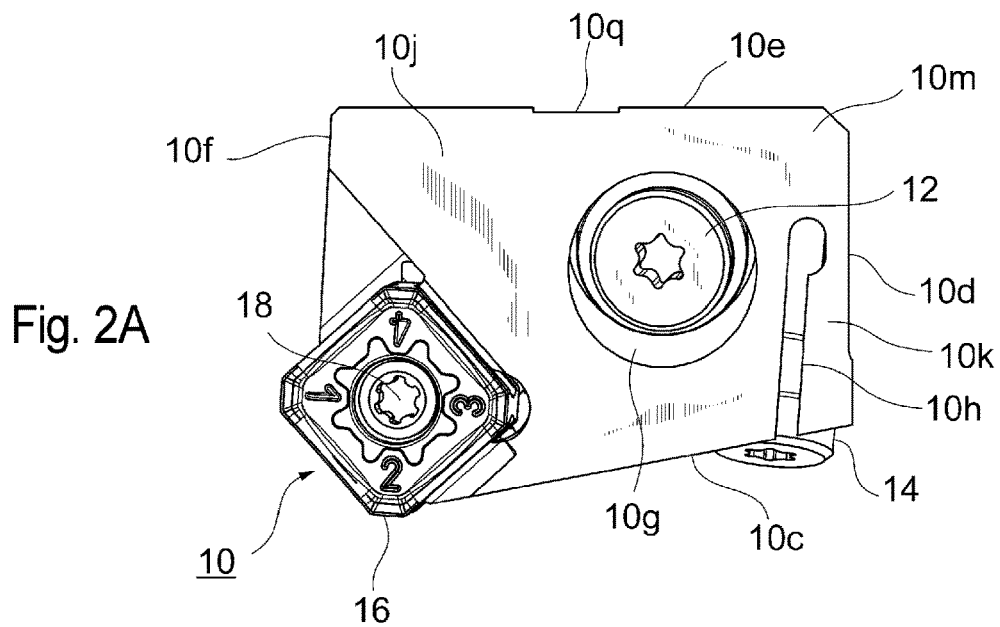
FIGS. 2A, 2B and 2C are a plan view, left side surface view, and front surface view of the cartridge 10, respectively.

As illustrated in FIG. 2A, the first side surface 10c and the second side surface 10d are connected through an obtuse angle in plan view, and the second side surface 10d and the third side surface 10e are on mutually perpendicular planes in plan view.

Furthermore, as illustrated in these drawings, the first side surface 10c, second side surface 10d, and third side surface 10e are on perpendicular planes to the upper surface 10a and the lower surface 10b.

Furthermore, a through hole 10g that opens to the upper surface 10a and the lower surface 10b and passes through the cartridge 10 is formed at the center of the cartridge 10. This through hole 10g is not perpendicular to the upper surface 10a and the lower surface 10b, but rather is formed obliquely. When securing the cartridge 10 to the body B (as described below), a male screw 12 ("first male screw") that passes through the through hole 10g is screwed into female threads ("first female threads") provided in the bottom surface of the cartridge mounting part. Note that the cartridge mounting part of the body B has a bottom surface and two mutually perpendicular side surfaces, and when the cartridge 10 is secured to the body B, the lower surface 10b is pressed to the bottom surface of the cartridge mounting part, and the second side surface 10d and the third side surface 10e are secured by pressing to the two side surfaces of the cartridge mounting part, respectively.

Furthermore, as illustrated in FIG. 2A, a slit 10h that connects the upper surface 10a, the first side surface 10c, and the lower surface 10b is provided between the through hole 10g of the cartridge and the second side surface 10d. As illustrated in FIG. 2C, the slit 10h is provided so as to divide the first side surface 10c into 2 parts, extending from the upper surface 10a to the lower surface 10b.

Therefore, on the cartridge 10, the portion from the slit 10h to the fourth side surface 10f is referred to as the main body part 10j, the portion from the slit 10h to the second side surface 10d is referred to as the thin material portion 10k, and the portion that connects the main body part 10j with the thin material part 10k is referred to as the connecting part 10m. As illustrated in FIG. 2A, the slit 10h is longer than half of the length in the depth direction of the cartridge 10 from the first side surface 10c to the third side surface 10e (The length of the connecting portion 10m from the bottom surface of the slit 10h to the third side surface 10e is shorter than half the length of the cartridge 10 in the depth direction).

Furthermore, a screw hole 10n is formed in the first side surface 10c so as to connect with the slit 10h, in the direction of the first side surface 10c to the third side surface 10e. The screw hole 10n is provided so as to be connected with the slit 10h, so the fourth side surface 10f side of the inner wall of the screw hole 10n is the main body part 10j, and the second side surface 10d side is the thin material portion 10k. Female threads ("second female threads") are formed on the inner wall of the screw hole 10n, and a male screw 14 (an example of the "second male screw") is screwed therein in order to adjust the position of the blade edge. As illustrated in FIG.

3B, the screw hole 10n is open to the third side surface 10e. A male screw 12 passes through the cartridge 10 and screws into the female threads of the body B, but the male screw 14 for adjusting the position of the blade edge screws into the female threads of the screw hole 10n, and remains in the cartridge 10. Furthermore, as shown by the fact that the male screw 14 is inclined in FIG. 3A, the screw hole 10n is provided to be inclined from the upper surface 10a to the lower surface 10b.

Further, as illustrated in FIG. 1, a holder part 10p for holding the cutting insert 16 is provided at corners of the upper surface 10 a, the first side surface 10 c, and the fourth side surface 10 f. A screw hole (not illustrated) is formed on the bottom surface of the holder part 10p, and a male screw 18 ("third male screw") that passes through a through hole formed in a center portion of the cutting insert 16 is screwed into the female threads ("third female threads") formed in this screw hole ("second screw hole"), and thereby the surface of the cutting insert 16 is pressed against the bottom surface and the two side surfaces of the holder part 10p, and secured to the cartridge 10. As illustrated in FIGS. 2A to 3C, when the cutting insert 16 is secured to the cartridge 10, the cutting blades of the cutting insert 16 protrude from the cartridge 10.

Figure 3A:
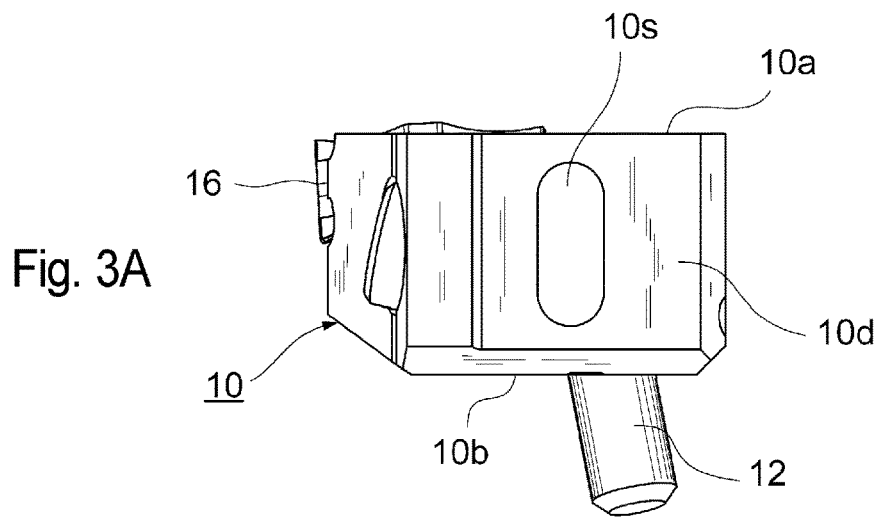
FIGS. 3A, 3B and 3C are a right side surface view, back surface view, and lower surface view of the cartridge 10, respectively.
Figure 3B:
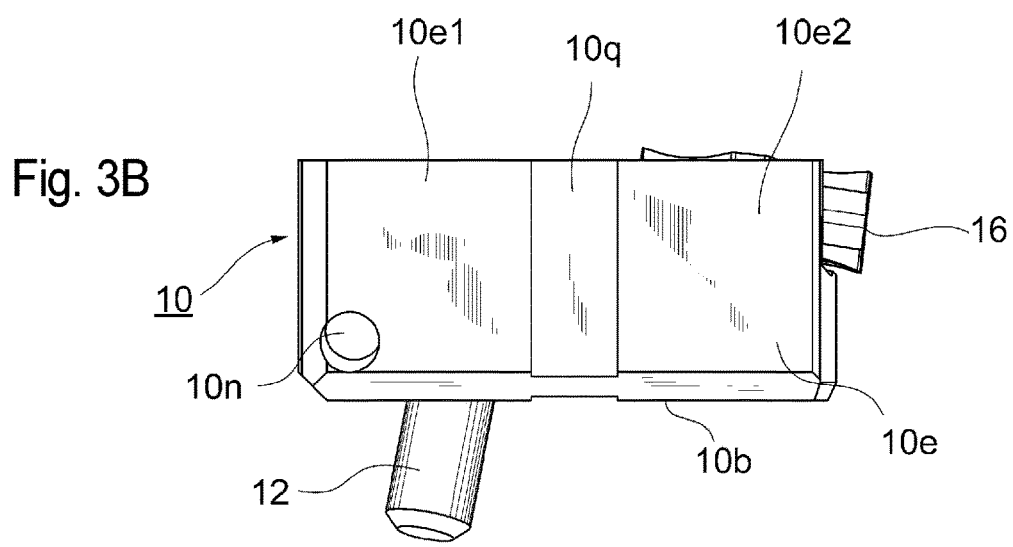

As illustrated in FIGS. 2A and 3B, a first groove part 10q is formed in the third side surface 10e. The third side surface 10e is divided into a side surface portion 10e1 on the second side surface 10d side and a side surface portion 10e2 on the fourth side surface 10f side by the groove part 10q.

Figure 2B:
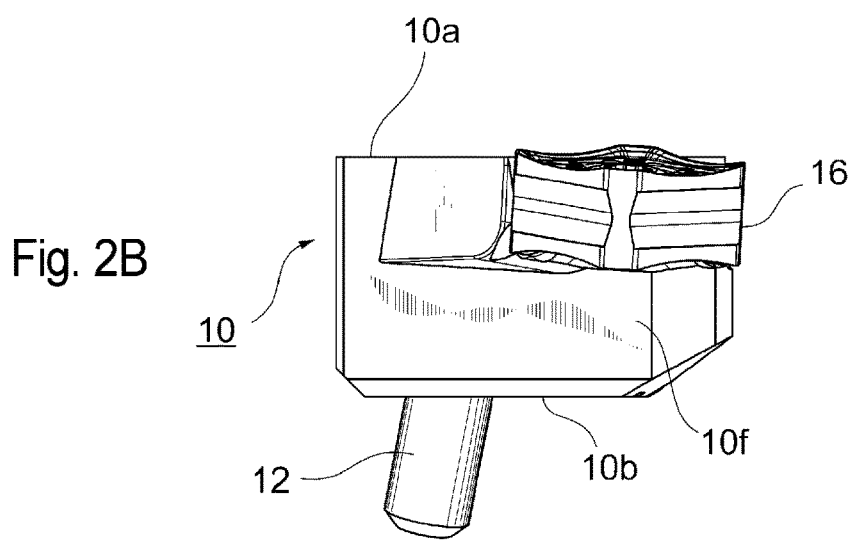
Figure 2C:
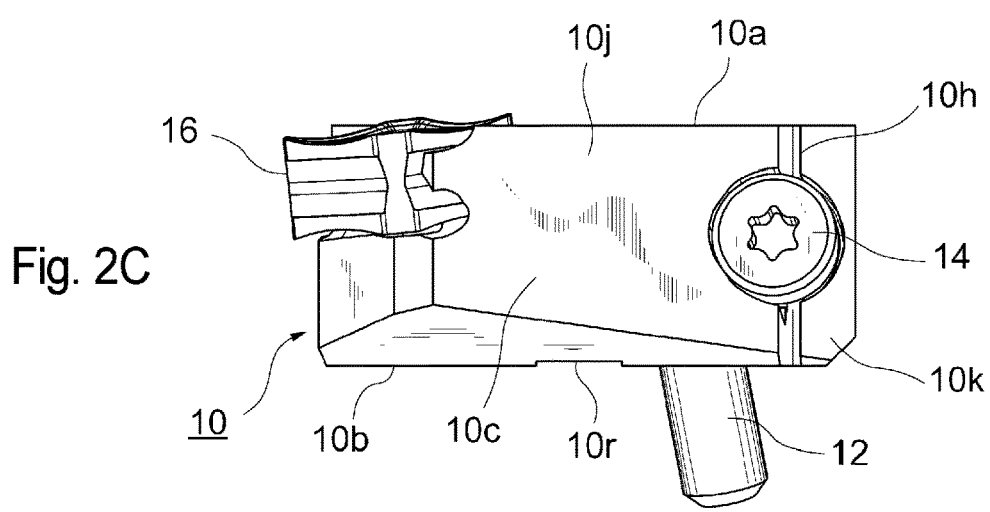
Figure 3C:
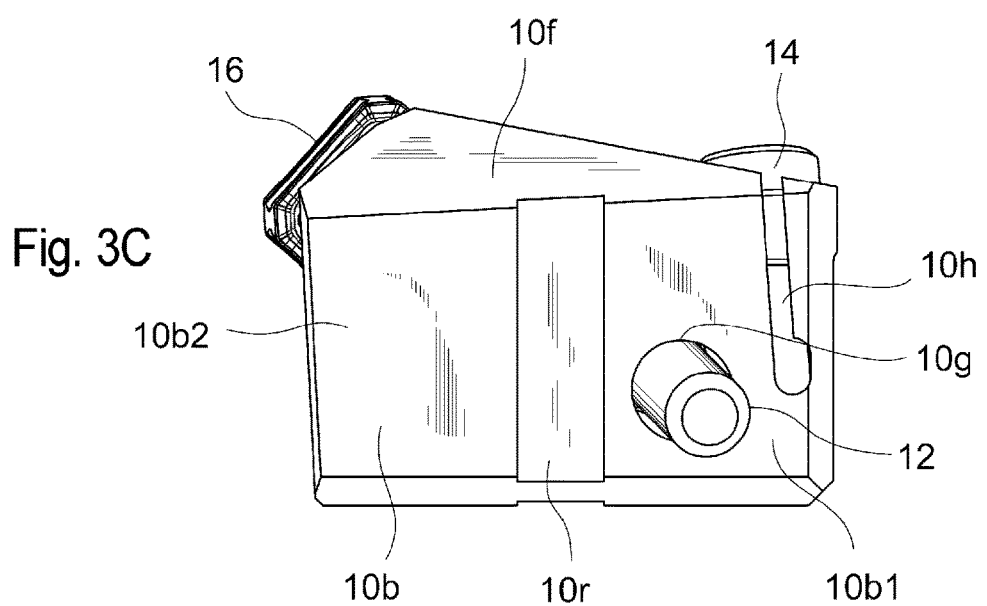

Furthermore, as illustrated in FIGS. 2C and 3C, a second groove part 10r is formed in the lower surface 10b as a concave portion. The lower surface 10b is divided into a first flat lower surface portion 10b1 on the second side surface 10d side and a second flat lower surface portion 10b2 on the fourth side surface 10f side by the groove part 10r.

Furthermore, a long hole 10s connected to the screw hole 10n is formed at a center portion of the second side surface 10d.

Next, the inner wall of the screw hole 10n is described using the drawings.

Figure 4:
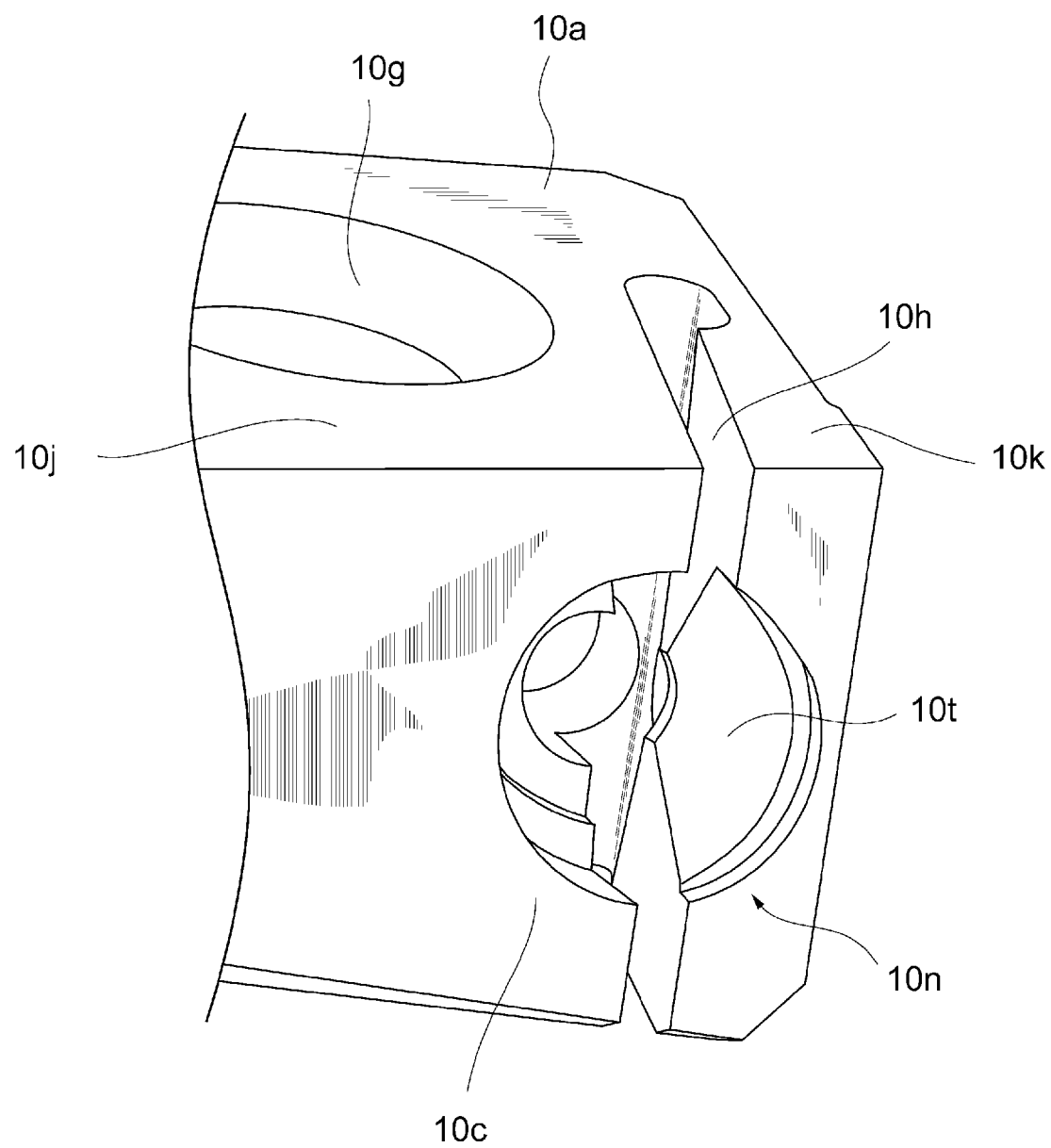
FIG. 4 is a perspective view of a screw hole 10n.
Figure 5B:
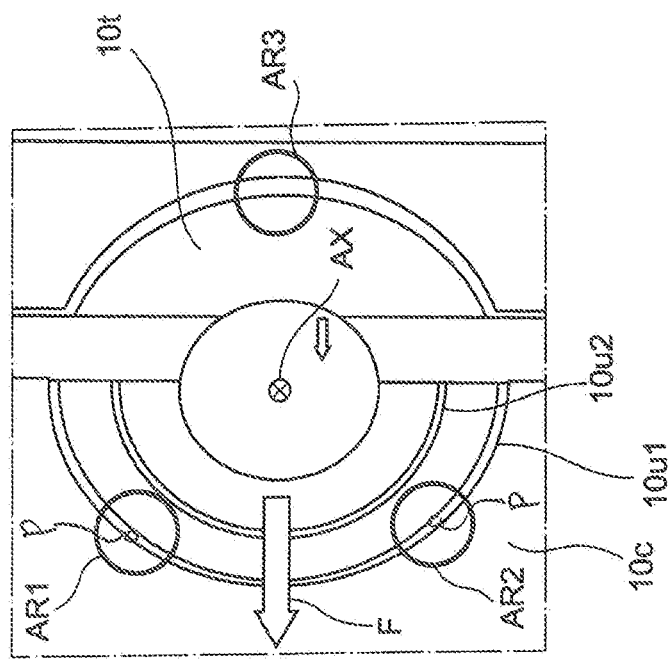
FIGS. 5A and 5B are diagrams for describing the condition of contact between the screw hole 10n and the male screw 14.
Figure 5A:
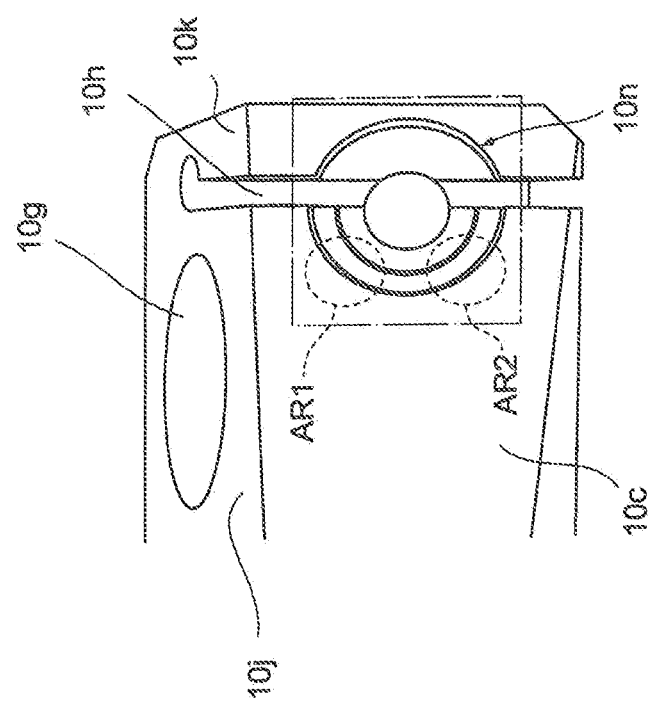

FIG. 4 is a perspective view of a screw hole 10n. FIGS. 5A and 5B are diagrams for describing the condition of contact between the screw hole 10n and the male screw 14.

Female threads into which the male screw 14 screws are formed in a tip end portion on the third side surface 10e side of the screw hole 10n. As illustrated in FIG. 4, the inner wall that connects from the female threads to the first side surface 10c has a different shape on the thin material portion 10k side as on the main body part 10j side.

A taper surface 10t which is the inner wall on the thin material portion 10k side is partially configured of a side surface of a right cone. Therefore, the axis of the right cone surface does not match the axis AX of the female threads of the screw hole 10n. Specifically, the tapered surface 10t is formed as a part of a conical surface formed so as to have an axis on a straight line parallel to the axis AX and moved by several millimeters in the direction parallel to the lower surface 10b on the fourth side surface 10d side.

On the other hand, of the inner walls connected from the female threads formed in the screw hole 10n to the first side surface 10c, the inner wall on the main body part 10j side is a cylindrical inner wall part 10u1 having a large diameter connected to the first side surface 10c and a cylindrical inner wall part 10u2 having a small diameter provided between the inner wall portion 10u1 and the female threads. As illustrated in FIG. 5B, minute protrusions P that protrude from the cone shaped inner wall surface of the inner wall part 10u1 in the direction of the axis AX are formed in two regions AR1 and AR2 with planar symmetry using as a reference the plane that includes the axis AX and where an intersecting line to the third side surface 10e is parallel. As will be described below in detail, when the male screw 14 is screwed into the female threads of the screw hole 10n and progresses in the axis AX direction, the screw head 14h of the male screw 14 comes into contact with the two protrusions P and the tapered surface 10t, and thereby a space interval of the slit 10h is opened, and the position of the cutting blade of the cutting insert 16 can be adjusted in conjunction with the main body part 10j moving in the direction of arrow F. Furthermore, a step is formed on the inner wall of the screw hole 10n by providing in the inner wall part 10u2. Furthermore, when the male screw 14 advances in the direction of the axis AX, the constriction of the male screw 14 (a portion that is located in the gap between the screw portion and the screw head 14h and increases in diameter toward the screw head 14h) at a predetermined position abuts against the step and therefore further advancement in the axis AX direction.is not possible. Therefore, plastic deformation of the thin material portion 10k that occurs if the male screw 14 is overtightened, can be prevented by the step functioning as a stopper.

Furthermore, a method of adjusting the position of the cutting blade of the cutting insert 16 using the cartridge 10 according to the present embodiment is described below.

First, the male screw 12 that passes through the through hole 10g is screwed into the female threads divided in the body B and temporarily fasten the cartridge tend to the body B. At this time, the male screw 12 is loosely tightened and temporarily attached with a force that is weaker than the force required when adjusting the cutting edge of the cutting insert 16 held by the holder part 10p of the cartridge 10. At this time, the lower surface 10b of the cartridge 10 contacts the bottom surface of the cartridge mounting part of the body B, and the second side surface 10d and the third side surface 10e are pressed against the two side surfaces of the cartridge mounting part, respectively.

Next, the male screw 14 for adjusting is screwed into the female threads formed in the screw hole 10n. At this time, the screw head 14h of the male screw 14 is not in contact with the inner wall of the screw hole 10n. The position of the male screw 14 in the axis AX direction of the screw hole 10n at this time is defined as the first position.

Furthermore, the male screw 14 for adjusting is rotated to advance the male screw 14 in the axis AX direction of the screw hole 10n.

Figure 6:
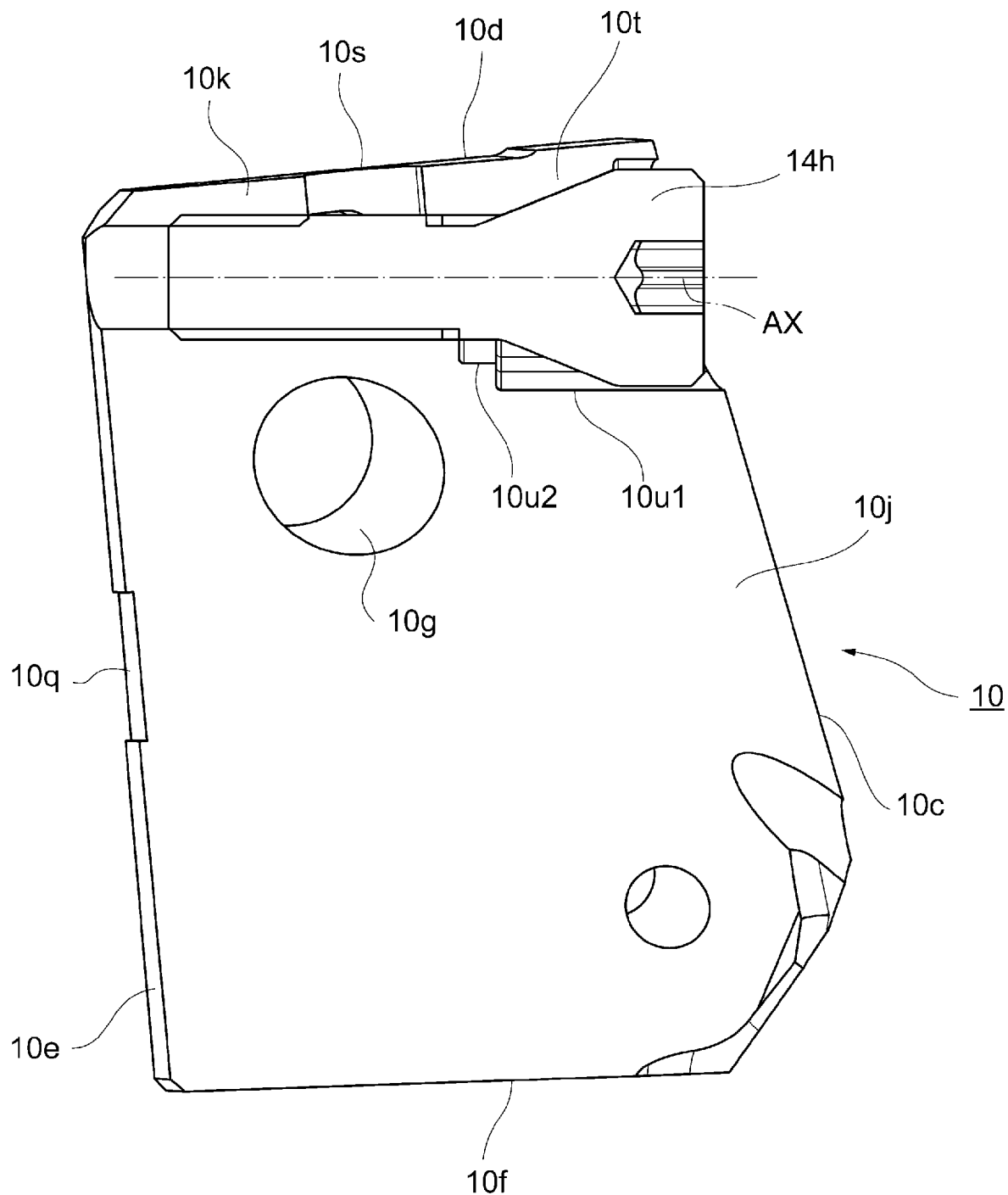
FIG. 6 is a diagram showing the positional relationship between the male screw 14 and the cartridge 10 at a cross-section through which the axis AX of the screw hole 10n passes.
Figure 7:
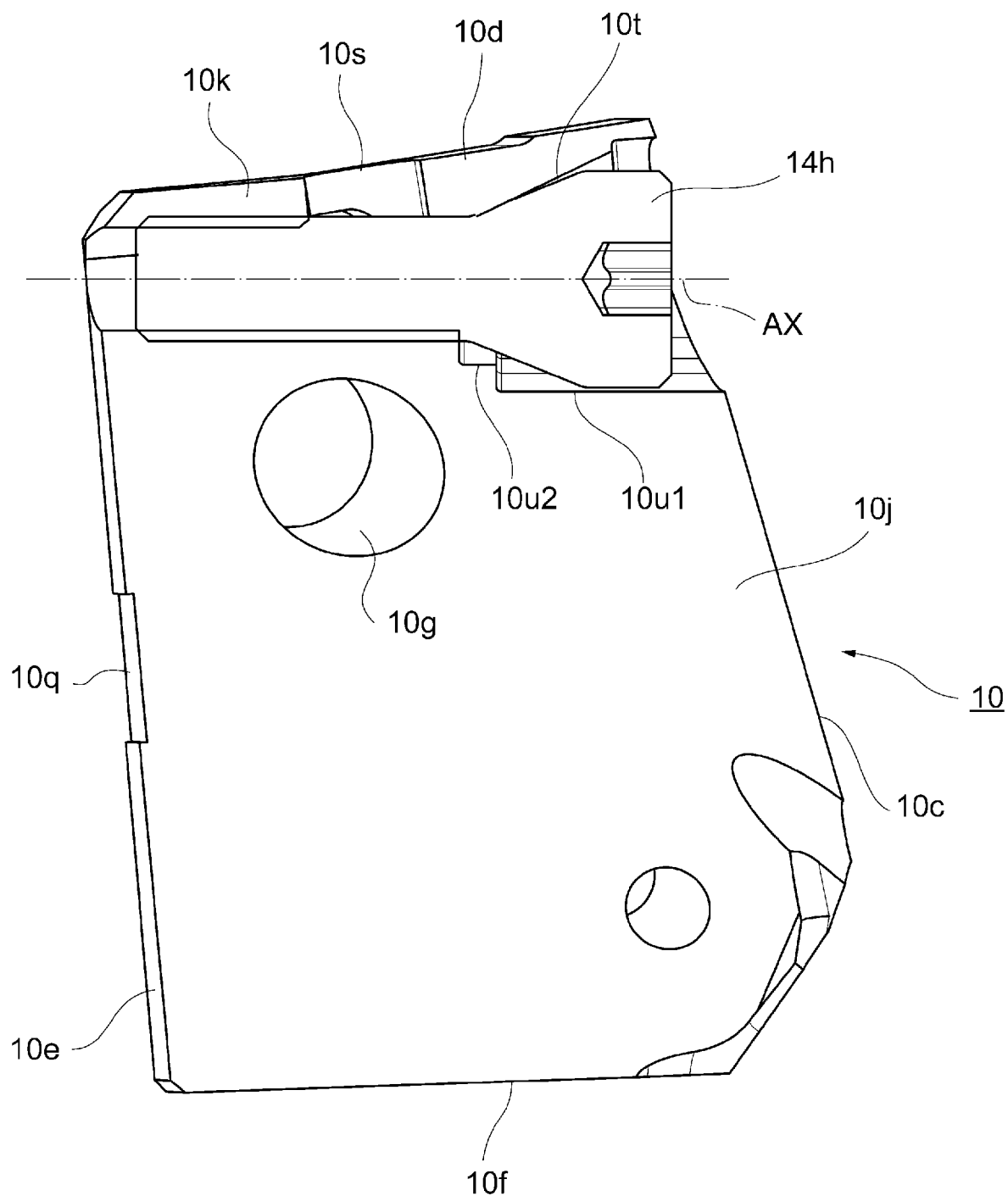
FIG. 7 is a diagram showing the positional relationship between the male screw 14 and the cartridge 10 when the male screw 14 progresses further in the direction of the axis AX.
Figure 8:
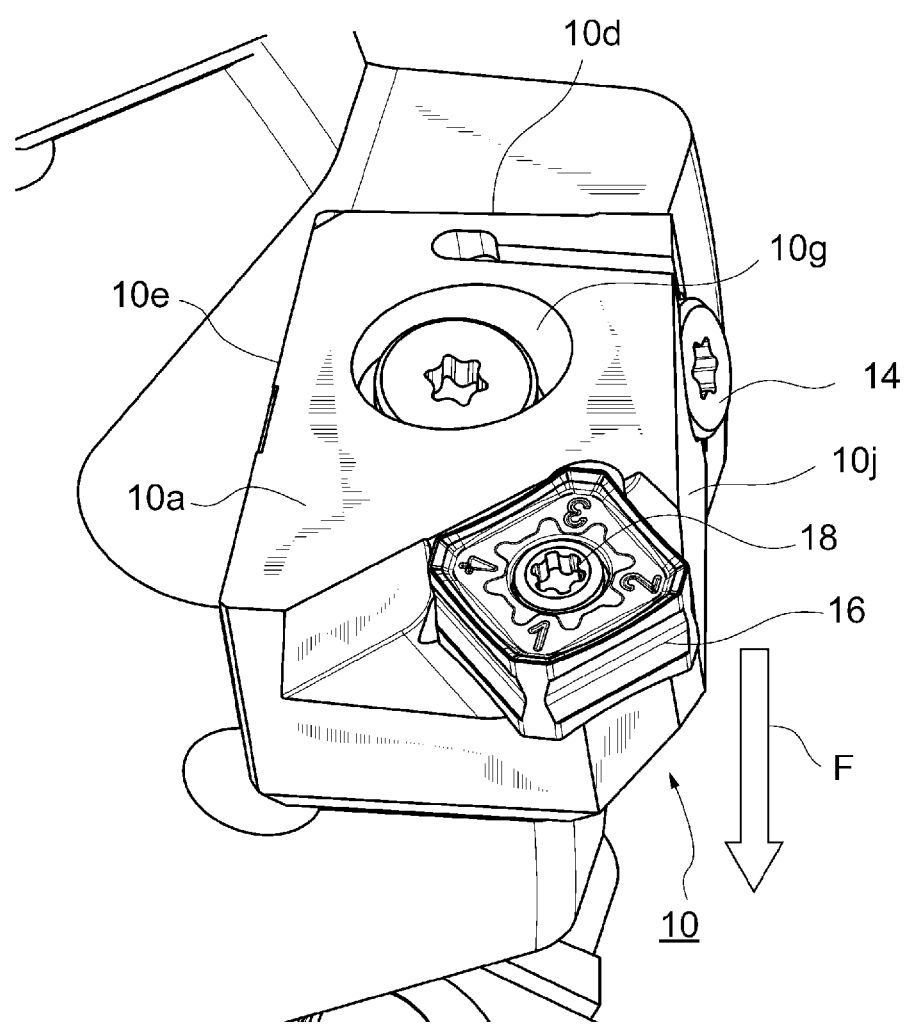
FIG. 8 is a diagram for describing the movement of the main body part 10j in conjunction with progression of the male screw 14.

FIG. 6 is a cross-sectional view of the cartridge 10 when the male screw 14 advances in the direction of axis AX and the intersecting line that intersects with the third side surface 10e and passes through axis AX is parallel with the lower surface 10b, and FIG. 7 is a cross-sectional view of the same cross section when the male screw 14 further advances in the axis AX direction. The position of the male screw 14 in the axis AX direction of the screw hole 10n in FIG. 7 is defined as the second position. Furthermore, FIG. 8 is a diagram illustrating a state in which the main body part 10j of the cartridge 10 moves with respect to the thin material portion 10k in conjunction with the advancement of the male screw 14 in the axis AX direction.

As shown in these drawings, the screw head 14h of the male screw 14 advances while being in contact with the tapered surface 10t from FIG. 6 to FIG. 7. On the other hand, the screw head 14h on the main body part 10j side of the screw hole 10n is in contact with the minute protrusions P provided in the area AR1 and the area AR2 of the inner wall part 10u1, respectively, and therefore the inner wall 10u1 and the inner wall 10u2 are not in contact with each other in the cross section illustrated in FIG. 6 and FIG. 7. Similarly, the inner wall portion 10u1 and the inner wall portion 10u2 are not in contact with each other even on a cross section perpendicular to the upper surface 10a and the lower surface 10b. Accordingly, from FIG. 6 to FIG. 7, the screw head 14h of the male screw 14 is in contact with the three points, including region AR1, region AR2, and region AR3 on the tapered surface 10t as shown in FIG. 5B, and advances in the direction of axis AX.

At this time, the region AR1 and the region AR2 are provided symmetrically in the vertical direction, and therefore the resultant force of the force acting on the cartridge 10 from the male screw 14 by contacting with the screw head 14h is a force in the horizontal direction parallel to the upper surface 10a and the lower surface 10b.

The thin material portion 10k and the connecting portion 10m having relatively low rigidity are elastically deformed, and the slit 10h opens with the connecting part 10m as a fulcrum, but the second side surface 10d and the third side surface 10e are restrained by being pressed to the wall surface of the holder mounting part, and therefore the main body part 10j moves so as to protrude in a direction (arrow F) parallel to the third side surface 10e that is restrained by the inner wall of the cartridge mounting part of the body B. In conjunction, the blade edge position of the cutting insert 16 held by the holder part 10p also moves, and therefore the blade edge position can be adjusted by adjusting the position of the male screw 14 in the axis AX direction.

After adjustment, the male screw 12 is finally tightened, and the cartridge 10 and the body B are secured with a force that does not move even if the cutting insert 16 is used for cutting.

Figure 9:
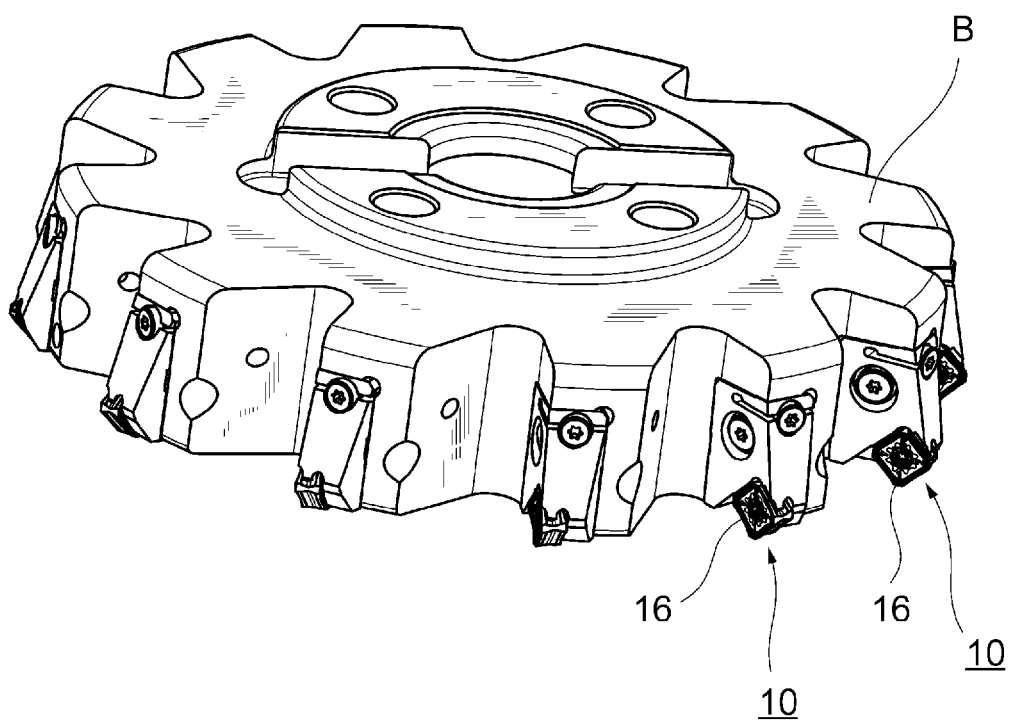
FIG. 9 is a perspective view of the body B on which 12 cartridges 10 are mounted.

FIG. 9 illustrates a condition where 12 cartridges 10 that retain the cutting insert 16 are mounted to 12 cartridge mounting parts provided on the body B as described above. In order to rotate the body B to perform milling, the blade edge position of the cutting insert 16 retained in the cartridges 10 must be adjusted. However, the position can be adjusted even if the body B is not provided with an adjusting mechanism, by using the cartridge 10 according to the present embodiment.

The cartridge 10 described above is configured such that two minute protrusions are vertically symmetrically formed on the inner wall part 10u1 on the main body part 10j of the screw hole 10n, and the two protrusions contact the screw head 14h. The screw head 14h does not contact the inner wall part 10u1 on a cross section perpendicular to the upper surface 10a and lower surface 10b. Therefore, a force in a direction perpendicular to the cartridge 10 can be suppressed such that the resultant force is in the horizontal direction (direction of fourth side wall 10f). As a result, a perpendicular force acts on the cartridge 10, and therefore, the main body 10 of the cartridge 10 can be made difficult to lift from the bottom surface of the cartridge mounting part of the body B.

Furthermore, the tapered surface 10t is a portion of the right circular cone having as a bottom surface a large-diameter circle with a straight line parallel to the axis AX on the fourth side surface 10f as an axis. Therefore, of the screw heads 14h, contact is easy to come into contact with a portion near the second side surface 10d (vertical portion in vertical direction). Therefore, contact is made in the region AR3, and a force in the horizontal direction can be applied.

However, the present invention is not limited to the present embodiment, and can be applied with a configuration where a portion other than the a screw formed of the male screws 14, such as the screw head 14 of the male screws 14 or the like, contacts the cartridge 10, and the main body part 10j moves relative to the thin material portion 10k as the male screw 14 advances in the axis AX direction.

Furthermore, the long hole 10s is provided, and therefore, a cross-sectional area of the second side surface 10d can be reduced, and the cartridge 10 can easily elastically deform.

However, the long hole 10s does not necessarily need to be provided.

Furthermore, in order to secure the strength in the gap with the through hole 10g as much as possible, the screw hole 10n obliquely provided and not parallel to the upper surface 10a and lower surface 10b. However, the screw hole is not limited thereto, and the screw hole 10n may be provided parallel to the upper surface 10a or lower surface 10b.

Furthermore, the groove part 10r was provided on the lower surface 10b. Therefore, even if the lower surface 10b point contacts at one point or a plurality of points with the bottom surface of the cartridge mounting part because it is difficult to process as a completely flat surface, the two lower surface part 10b1 and lower surface part 10b2 divided by the groove part 10r can contact the bottom surface of the cartridge mounting part. Thus, the lower surface 10b can be stably restrained (in other words, the lower surface 10b and bottom surface of the cartridge mounting part can be prevented from contacting only at one point near a center portion of the lower surface 10b or at a plurality of points.

Similarly, the groove part 10q is provided on the third side surface 10e, and therefore, a side surface of the cartridge mounting part and the third side surface 10e can be stably restrained.

Furthermore, the slit 10h is formed longer than half the depth of the cartridge 10, and therefore, the connecting part 10m can be suitably elastically deformed as a fulcrum.

Furthermore, the cutting insert 16 may be integrated with the cartridge 10 by brazing or the like. Furthermore, a plurality of cutting inserts 16 may be integrated with the cartridge 10.

Furthermore, the names of upper surfaces, lower surfaces, and side surfaces in the present embodiment are merely for convenience. Furthermore, the name of "thin material portion" is merely named for convenience in order to clearly describe a portion with a relative small thickness as compared to the main body part, and should not be used to interpret the present embodiment in a limiting manner.

The embodiment described above is used to facilitate understanding of the present invention, and the present invention is not meant to limit the present invention. elements included in the embodiment, arrangements, material, conditions, shapes, sizes, and the like thereof described in the embodiment are not limited to those exemplified and can be appropriately modified or omitted within an ordinary creative ability of a person with ordinary skill in the art.

Second Embodiment

As illustrated in FIG. 2B, the male screw 12 is inclined so as to approach the third side surface 10e as it advances towards the tip end. Furthermore, as illustrated in FIG. 2C, the male screw 12 is inclined so as to approach the second side surface 10d as it advances toward the tip end. Therefore, when the male screw is screwed to female threads provided on the bottom surface of the cartridge mounting part of the body B, the head of the male screw 12 moves the cartridge 10 in the axial direction, that is, in a direction approaching the second side surface 10d, and is also pressed in the direction approaching the third side surface 10e. Therefore, the lower surface 10b of the cartridge 10 is pressed against the bottom surface of the cartridge mounting part, and the second side surface 10d and the third side surface 10e are pressed against the two side surfaces of the cartridge mounting part, respectively, and thereby the cartridge is secured to the body B.

At this time, by adjusting the inclination angle of the male screw 12, or in other words, by screwing the male screw 12 to the through hole 10g through which the male screw 12 passes, and adjusting the angle of inclination of the axis of the female threads provided on the bottom surface of the cartridge mounting part, the various forces that press the lower surface 10b of the cartridge 10, the second side surface 10d, and the third side surface 10e, to the body B, and the ratios thereof can be adjusted. For example, by reducing the inclination, the force with which the lower surface 10b is pressed against the bottom surface of the cartridge mounting portion can be increased. Alternatively, by increasing the inclination toward the second side surface 10d, the force with which the second side surface 10d is pressed against the side surface of the cartridge mounting part can be increased.

However, the inventors of the present application were aware that the optimal angle of inclination for mounting a cartridge with an adjusting mechanism such as the cartridge 10 to the body, or in other words, the angle of inclination of the axis of the female threads provided in the bottom surface of the cartridge mounting part, and the optimal angle of inclination for mounting a cartridge that does not have an adjusting mechanism, or in other words the angle of inclination of the axis of the female threads provided in the bottom surface of the cartridge mounting part are not necessarily the same. For example, there are cases where the female threads with a large inclination with regard to the bottom surface are formed in the bottom surface portion of the cartridge mounting part in order to favorably mount a cartridge that does not have an adjusting mechanism. When the cartridge 10 having an adjustment mechanism is mounted on the cartridge mounting part where female threads are formed, there is a possibility that the force with which the second side surface 10d and the third side surface 10e are pressed against the body B becomes larger than expected. If the force with which the second side surface 10d and the third side surface 10e are pressed to the body B is too large, the male screw 14 for adjusting the blade edge position is rotated and brought into contact with the tapered surface 10t while advancing, the main body part 10j will not move as expected.

Therefore, the cartridge 20 according to the second embodiment has a configuration that provides an adjusting mechanism for the blade edge position and can favorably mount onto a body where female threads with a large inclination are formed on a bottom surface portion of the cartridge mounting part. Incidentally, component elements which have a function similar to Embodiment 1 are assigned the same symbols, and a detailed description may be omitted.

Figure 10:
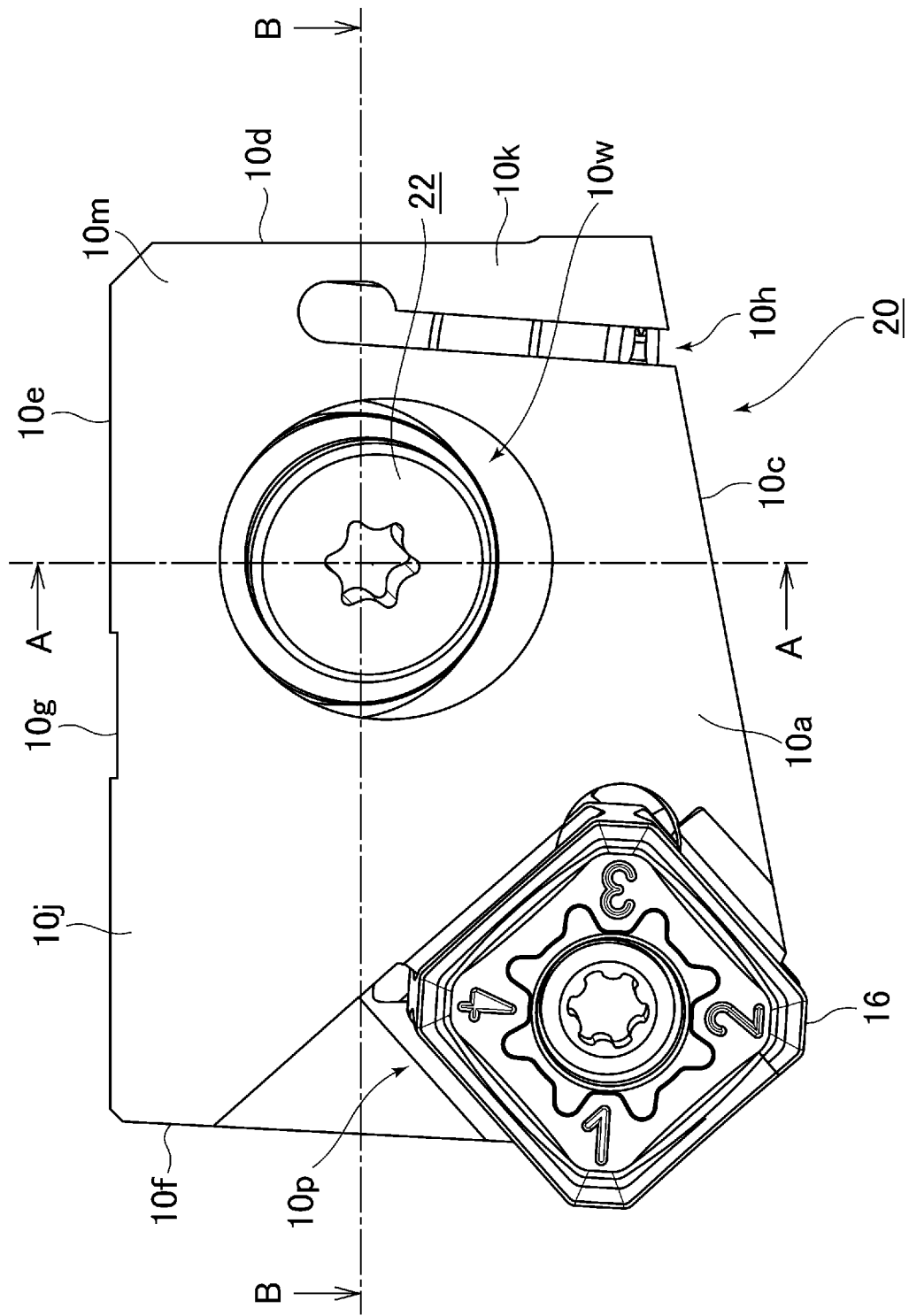
FIG. 10 is a plan view of a cartridge 10 according to a second embodiment.
Figure 11:
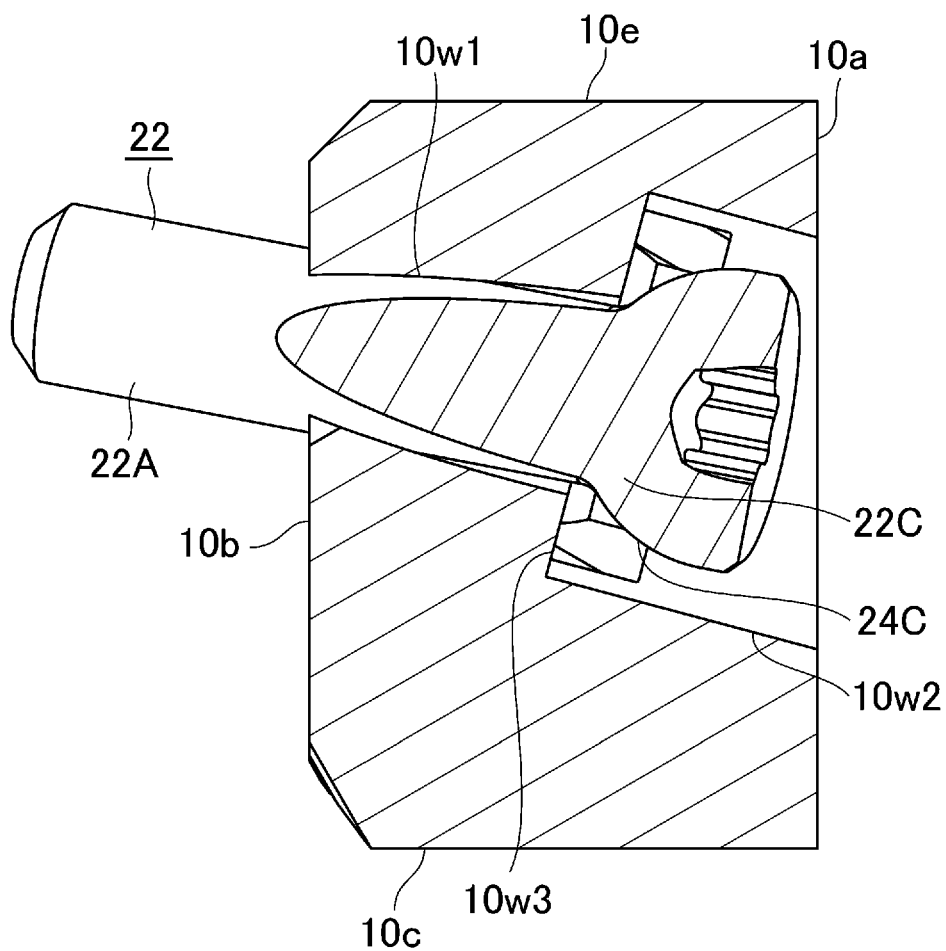
FIG. 11 illustrates the cross-section A-A in FIG. 10.
Figure 13:
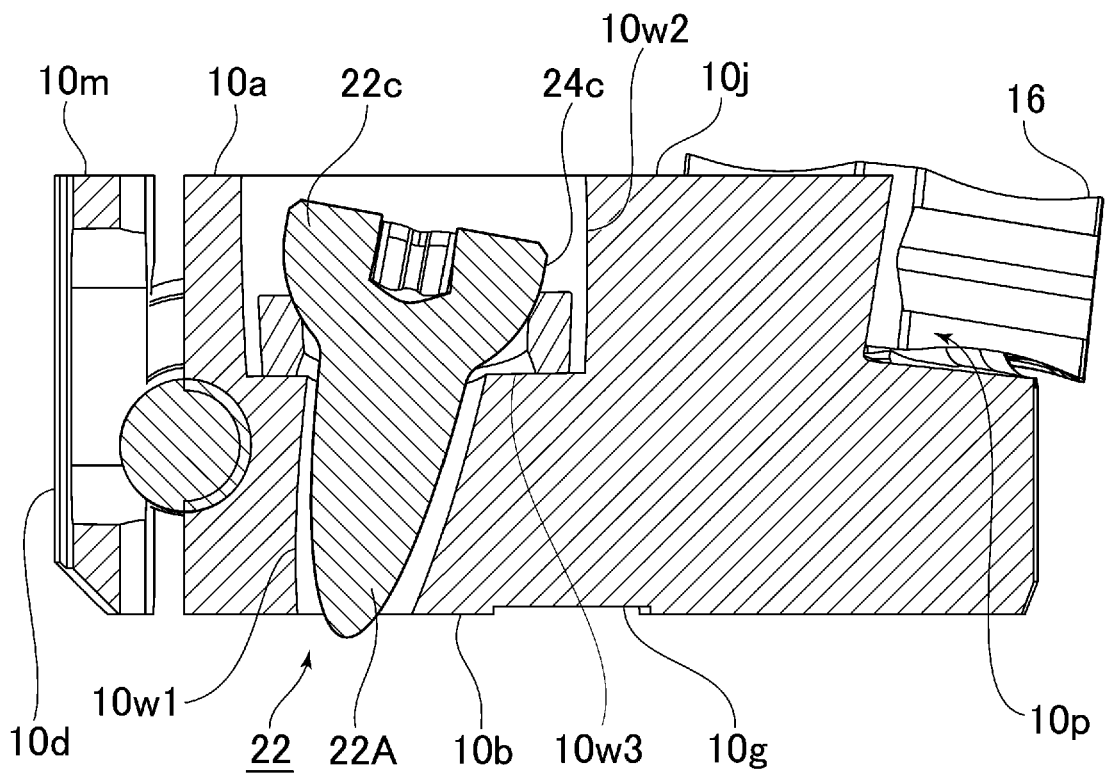
FIG. 13 illustrates the cross-section B-B in FIG. 10.

FIG. 10 is a plan view of a cartridge 20 according to the second embodiment. FIG. 11 shows the cross-section A-A in FIG. 10. Furthermore, FIG. 13 is a cross-section view of line B-B in FIG. 10. The surface of the cartridge 20 has an upper surface 10a, a lower surface 10b, a first side surface 10c, a second side surface 10d, a third side surface 10e, and a fourth site surface 10f. Furthermore, a through hole 10w that passes through the upper surface 10a and the lower surface 10b is formed at the center portion of the cartridge 20. The configuration of other portions of the cartridge 20 are the same as those of the cartridge 10, and will not be described.

Similar to the through-hole 10g, the through-hole 10w is not formed perpendicular to the upper surface 10a and the lower surface 10b, and has a cylindrical surface 10w1 that is open on the lower surface 10b as an inner wall, and has an axis that is inclined so as to move away from the upper surface 10a and approach the lower surface 10b when approaching the second side surface 10d and the third side surface 10e, or in other words when approaching a corner of the cartridge 10 that is connected to the second side surface 10d and the third side surface 10e. Furthermore, the through-hole 10w is connected with the cylindrical surface 10w1, has a common axis with the cylindrical surface 10w1, and has a cylindrical surface 10w2 that is larger in diameter than the cylindrical surface 10w1 and opens to the upper surface 10a as an inner wall. Furthermore, the through hole 10w includes a connecting surface 10w3 that connects to the cylindrical surface 10w1 and the cylindrical surface 10w2 and is inclined with respect to the upper surface 10a. In other words, the connection surface 10w3 is inclined with respect to the upper surface 10a such that the upper surface 10a is approached when approaching the third side surface 10e. Therefore, in the cross section that is substantially perpendicular to the third side surface 10e illustrated in FIG. 11, the connection surface 10w3 is inclined so as to approach the upper surface 10a and move away from the lower surface 10b when approaching the third side surface 10e. On the other hand, as illustrated in FIG. 13, the distance between the connection surface 10w3 and the upper surface 10a does not fluctuate even when the connection surface 10w3 approaches the second side surface 10d in a cross section substantially perpendicular to the second side surface 10d. Therefore, in the cross section perpendicular to the cross section as illustrated in FIG. 11, the upper surface 10a and the connection surface 10w3 are parallel. In other words, a normal line to the connection surface 10w3 is inclined at an acute angle with respect to the axes of the cylindrical surface 10w1 and the cylindrical surface 10w2 so as to exist on the AA cross section perpendicular to the third side surface 10e. The cylindrical surface 10w2 and the connection surface 10w3 constitute a counterbore for accommodating the head portion 22A of the male screw 22 in a region between the upper surface 10a and the lower surface 10b.

In addition, female threads having a common axis with the cylindrical surface 10w1 are formed at a bottom surface of the cartridge mounting part of the body B, the axis being inclined such that the axis approaches to a plane including the side surface of the cartridge mounting part that is in contact with the second side surface 10d, and a plane that includes the side surface of the cartridge mounting part that contacts the third side surface 10e when moving away from the bottom surface.

Figure 12A:
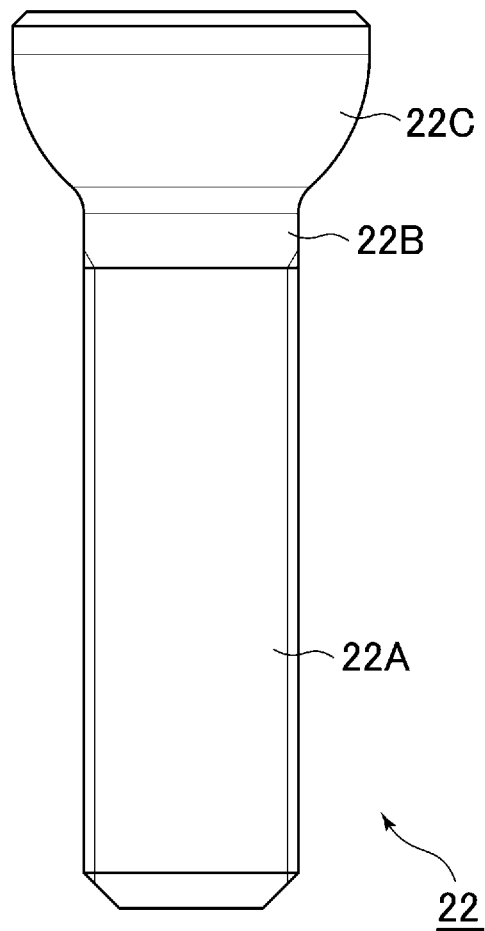
FIG. 12A illustrates a male screw 22 according to the second embodiment.
Figure 12B:
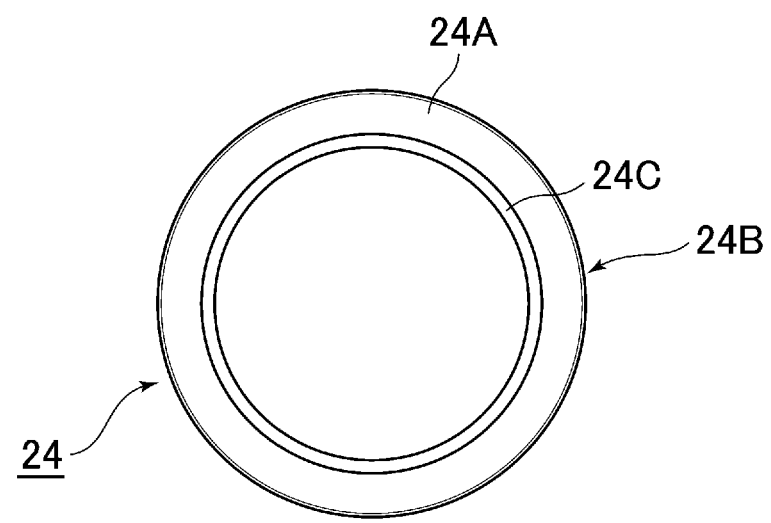
FIG. 12B is a plan view of a washer 24 according to the second embodiment.
Figure 12C:
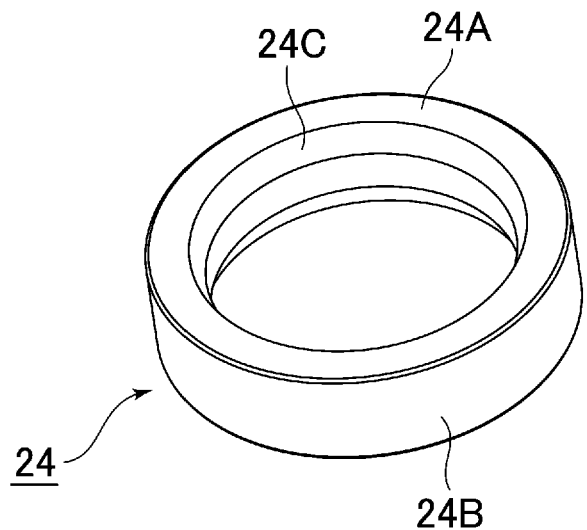
FIG. 12C is a perspective view of a washer 24 according to the second embodiment.

FIG. 12A is a front view of the male screw 22. As illustrated in the figure, the male screw 22 includes a shaft part 22A, a head part 22C, and a neck part 22B that connects the shaft part 22A and the head part 22C.

The shaft portion 22A is formed with a male screw for screwing to female threads formed on the bottom surface of the cartridge mounting portion of the body B. The neck portion 22B is formed in a cylindrical shape.

The head part 22C includes a spherical surface that is circular in a cross section perpendicular to the axis and is a circular arc having a radius of 5 mm, for example, in a cross section including the axis so that the diameter increases as the distance from the neck portion 22B increases. Further, a hexalobular hole is formed on the upper surface of the head portion 22C.

12B and 12C illustrate a plan view and a perspective view of the washer 24 inserted between the male screw 22 and the connection surface 10w3. As shown in the drawings, the washer 24 is an annular component having an annular end surface 24A facing upward and an outer surface 24B formed of a cylindrical surface. Furthermore, the washer 24 is connected to the end surface 24A so as to be able to be in contact with the spherical surface of the head part 22C, and includes a spherical surface 24C having the same diameter as the spherical surface of the head portion 22C as a portion of the inner surface.

As illustrated in FIG. 11, when the cartridge 20 is attached to the body B using the male screw 22, the washer 24 is placed so that the lower end surface of the washer 24 abuts the connection surface 10w3, and then the male screw 22 is inserted into the through hole 10w of the cartridge 20 so as to face the spherical surface 24C of the washer 24 and the spherical surface of the head 22C of the male screw 22. Furthermore, in a state where the male screw 22 and the female threads formed on the bottom surface of the cartridge B mounting part of the body B are screwed together, the male screw 22 is rotated and advanced in the axial direction. The cartridge 20 can be temporarily secured to the body B by bringing the spherical surface of the head 22C of the male screw 22 into contact with the spherical surface 24C of the washer 24. Thereafter, in the same manner as in the first embodiment, female threads formed in a screw hole 10n that connects with the slit 10h and a male screw 14 are screwed together to adjust the blade edge position of the cutting insert 16. After the adjustment, the male screw 22 is finally tightened to secure the cartridge 20 and the body B.

With this cartridge 20, the connection surface 10w3 is pressed from the head 22C of the male screw 22 via the washer 24, so that the force from the head 22C of the male screw 22 functions as a working surface that acts via the washer 24. The force acting in the normal direction of the connection surface 10w3 has a component force in a direction perpendicular to the third side surface 10e and a component force in the direction perpendicular to the lower surface 10b that is greater than the component force in the direction perpendicular to the third side surface 10e. Therefore, the lower surface 10b of the cartridge 10 can be pressed toward the body B with a relatively large force, and thus the third side surface 10e can be pressed toward the body B with a relatively small force. On the other hand, the force acting in the normal direction of the connection surface 10w3 does not have a component force toward the second side surface 10d. Therefore, it is possible to relatively reduce the force pressing the second side surface 10d toward the body B. Furthermore, even if the cartridges have different angles of inclination, the cartridges can be secured using the same male screw 22 and washer 24.

However, the connection surface 10w3 may be inclined to be parallel or close to parallel with the upper surface 10a. By inclining the connection surface 10w3 to be parallel or close to parallel with the upper surface 10a, the force pressing the lower surface 10b toward the body B can be increased. Alternatively, the connection surface 10w3 can be inclined toward the upper surface 10a while facing the same direction as the upper surface 10a, such that the force pressing the second side surface 10d and third side surface 10e toward the body B can be increased. Herein, the normal line of the connection surface 10w3 can be inclined toward the axis of the cylindrical surface 10w1 and cylindrical surface 10w2, such that the force pressing the second side surface 10d or third side surface 10e toward the body B can be increased or reduced. In the present embodiment, in order to more strongly secure in the radial direction where a large load is applied, of the third side surfaces 10e facing the radial direction so as to face the rotating shaft of the body B, the angle formed by the normal line of the connection surface 10w3 with the flat surface (for example, cross-section A-A) perpendicular to the portion contacting the body B is configured to be smaller than the angle formed by the axis of the circular surface 10w1 and circular surface 10w2. For example, when the normal line of the connection surface 10w3 is parallel to the cross section A-A, the angle formed by both is 0 degrees. As a result, a configuration can be implemented where the force pressing the third side surface 10e toward the body B is large than the force pressing the second side surface 10d toward the body B Even when the connection surface 10w3 is provided as described above, the angle with regard to the axis of the cylindrical surface 10w1 can be adjusted. Therefore, adjustments can be performed such that the force where the lower surface 10b of the cartridge 10 presses toward the body B, the force where the second side surface 10d presses toward the body B, and the force where the third side surface 10e presses toward the body B are different.

Note that the cylindrical surface 10w1 does not contact the head part 22C, and therefore does not need to be formed into a cylindrical shape.

Furthermore, the spherical surface of the head part 22C of the male screw 22 and the spherical surface 24C of the washer 24 contacting the spherical surface have the same radius. Therefore, even if the male screw 22 is oblique for example, partial contact with the washer 24 can be suppressed. However, the same curvature does not need to be provided. For example, the surface may be configured from a curved surface having a smaller curvature than the curvature of the spherical surface of the head part 22C of the male screw 22. However, the male screw 22 advances in the axial direction while rotating, and therefore it is preferable to form the inner surface in a rotationally symmetrical manner with respect to the axis.

DESCRIPTION OF CODES 10, 20 cartridge
10a upper surface
10b lower surface
10c, 10d, 10e, 10f side surface
10g through hole
10h slit
10j main body part
10k thin material portion
10m connecting part
10n screw hole
10p holder part
10q groove part
10r groove part
10s long hole
10t taper surface
12, 14, 18, 22 male screw
14h screw head
B body
24 washer

The invention claimed is:
1. A cartridge to be mounted on a body of a milling tool, the cartridge comprising:

an upper surface, a lower surface, at least a first side surface, a second side surface, a third side surface, and a fourth side surface joined to the upper surface and the lower surface, the fourth side surface being opposite the second side surface and joined to the first side surface and the third side surface; and a holder part for holding a cutting insert;

wherein a slit that is connected to the upper surface, the lower surface, and the first side surface, and that divides the cartridge into a main body part having a thickness between the slit and the fourth side surface, a thin material portion having a thickness between the slit and the second side surface smaller than the thickness of the main body part, and a connecting part that connects the main body part and the thin material portion;

a through hole where a first male screw for retaining the body and the cartridge by screwing into first female threads provided in the body, passes through; and a screw hole that connects with the slit and formed with second female threads in order for a second male screw to screw into and remain inside the cartridge, are formed;

wherein a relative position of the main body part with regard to the thin material portion when the second male screw that screws into the second female threads is located at a first position in the axial direction of the second female threads, is different from a relative position of the main body part with regard to the thin material portion when the second male screw that screws into the second female threads is located at a second position in the axial direction of the second female threads;

a head part of the second male screw at the second position contacts the cartridge; and the second side surface has a hole that connects to the slit formed therein.

2. The cartridge according to claim 1, wherein when the cartridge is mounted on the body, the lower surface has:
 a first flat portion for contacting a surface of the body;
 a second flat portion for contacting a surface of the body; and
 a concave portion provided between the first flat portion and the second flat portion, formed by recessing from the first flat portion and the second flat portion.

3. The cartridge according to claim 1, wherein the through hole for the first male screw to pass is open on the lower surface.

4. The cartridge according to claim 1, wherein the second side surface is connected to the upper surface, the lower surface, and the first side surface; and the third side surface is connected to the upper surface, the lower surface, and the second side surface; and when the cartridge is mounted on the body, the lower surface has:
 a first flat portion for contacting a surface of the body;
 a second flat portion for contacting a surface of the body; and
 a concave portion provided between the third flat portion and the fourth flat portion, formed by recessing from the first flat portion and the second flat portion.

5. The cartridge according to claim 1, wherein the screw hole has
 a conical surface formed to pass through the axis of the second female threads, and for the head part of the second male screw to contact when the second male screw is at the second position, in one of a plurality of regions divided by the slit a.

6. The cartridge according to claim 5, wherein the screw hole has one or a plurality of protrusions formed in another one of the plurality of regions divided by the slit in order for the head part of the second male screw to contact when the second male screw is at the second position.

7. The cartridge according to claim 6, wherein the number of protrusions is two, and
 the protrusions are provided at a position perpendicular to the slit, and at symmetrical positions with respect to a flat surface through which the axis of the second female threads passes.

8. The cartridge according to claim 1, wherein
 a second screw hole where the third female threads are formed is provided in the holder part for the third male screw to screw into in order to retain the cutting insert.

9. The cartridge according to claim 1, wherein the through hole for the first male screw to pass through is open on the lower surface, has a cylindrical surface with an axis that is oblique to the lower surface and faces a shaft part of the first male screw, and an operating surface at an acute angle to the axis, upon which a force from the head part of the first male screw is applied.

10. The cartridge according to claim 9, further comprising: the first male screw including in the head part a spherical surface facing the direction of the shaft part, and a washer with an inner side surface including a curved surface that contacts the spherical surface inserted between the head part of the first male screw and the operating surface.

11. The cartridge according to claim 9, wherein the second side surface is configured so as to face a rotating shaft of the body of the milling tool, and
 the operating surface is formed in the second side surface such that the angle formed between the perpendicular flat surface of the portion that contacts the body and a normal line to the operating surface is smaller than the angle formed between the perpendicular flat surface of the portion that contacts the body and the axis.

12. A milling tool, comprising a body on which a plurality of cartridges according to claim 1 are mounted.

* * * * *